(12) United States Patent
Cunningham

(10) Patent No.: US 7,275,459 B2
(45) Date of Patent: Oct. 2, 2007

(54) SPRING LOADED DEVICE ASSEMBLY

(76) Inventor: John P. Cunningham, P.O. Box 7146, Charleston, WV (US) 25356

( * ) Notice: Subject to any disclaimer, the term of this patent is extended or adjusted under 35 U.S.C. 154(b) by 610 days.

(21) Appl. No.: 10/765,168

(22) Filed: Jan. 28, 2004

(65) Prior Publication Data

US 2005/0160865 A1    Jul. 28, 2005

(51) Int. Cl.
*F16C 1/10*    (2006.01)
(52) U.S. Cl. ..................................... 74/502.4
(58) Field of Classification Search ............. 74/500.5, 74/501.5 H, 502.4, 504, 511 R
See application file for complete search history.

(56) References Cited

U.S. PATENT DOCUMENTS

| | | |
|---|---|---|
| 1,200,199 A | 10/1916 | Johnson |
| 2,186,653 A | 1/1940 | Penote |
| 3,096,663 A | 7/1963 | Sink |
| 3,898,891 A | 8/1975 | Colloton |
| 4,059,025 A | 11/1977 | Waack et al. |
| 4,117,809 A * | 10/1978 | Kittler ................. 123/403 |
| 4,223,564 A | 9/1980 | Fawcett |
| 4,911,312 A * | 3/1990 | Jeruzal ................. 211/183 |
| 5,191,866 A * | 3/1993 | Tosdale ................. 123/400 |

OTHER PUBLICATIONS

"Hydroback (A Unique Self-Centering Mechanism For Push-Pull Control Cables0", Cablecraft Division, Tuthill Corporation, Tacoma, Washington.

* cited by examiner

*Primary Examiner*—Vicky A. Johnson
(74) *Attorney, Agent, or Firm*—Akerman Senterfitt; Jean C. Edwards, Esq

(57) ABSTRACT

A spring loaded device assembly includes a spring loaded device for use with hydraulic systems, the spring loaded device including: a spring mechanism disposed in an outer tubular member; an inner tubular member movably disposed in one end of the outer tubular member; an adjustment rod movably disposed in the inner tubular member; a clevis attached to a distal end of the adjustment rod for attachment to a hydraulic system; and a rigid mounting member having two ends, a first end being attached to another end of the outer tubular member, and a second end being attached to the hydraulic system to prevent swivel of the spring loaded device.

9 Claims, 5 Drawing Sheets

SPRING LOADED DEVICE ASSEMBLY

The present invention relates to a spring loaded device assembly for centering controls on hydrostatic transmissions and non-detented hydraulic valves used in vehicles.

BACKGROUND OF THE INVENTION

Previous spring loaded devices, as shown in FIG. 1, include self-centering mechanisms 100 for push-pull control cables 101, which are especially useful for centering controls on hydrostatic and non-detented hydraulic valves used in vehicles.

The spring loaded device of FIG. 1 is a push-pull coaxial cable control mechanism 100, and in particular, a self-centering apparatus that is mounted directly on standard control cables 101 or as part of a new control cable for imparting spring return force to cable members 101 in response to relative movement thereof, out of a predetermined intermediate or neutral position. The conventional spring loaded devices were designed to eliminate bulky dual-spring systems and extra brackets and levers.

In particular, a conventional self-centering spring mechanism is described in detail in U.S. Pat. No. 4,223,564 to Fawcett, the entire contents of which are herein incorporated by reference.

In Fawcett, the self-centering spring mechanism 200 is applied to a push-pull coaxial cable mounted on the end assembly of a control cable 201. The cable 201 terminates in a mounting fixture 202 threaded over a portion of its length to receive jamb nuts 203, 204 designed to clamp against opposite sides of a support such as a mounting panel 205 through which the fixture 202 passes.

The self-centering device 200 includes outer and inner elongated tubular members 206, 207 forming an annular space between them in which an elongated helical spring 208 is received. The spring 208 is partially compressed in the neutral or centered position of the parts.

Actuator rod 209 is threaded over a portion of its projecting length to engage in the threaded socket of a connecting clevis 210 linked by pivot pin 211 to the transmission actuator arm. A jamb nut 212 on the rod 209 bears against the end of the clevis 210 to tighten the connection.

In this conventional cable assembly and its conventional connection by way of the clevis 210 to the transmission shifter arm (not shown) of a hydrostatic drive transmission, relative longitudinal movement of the cable members are effected at a remote point (see 103, FIG. 1), such as in the truck cab, and causes the shifter arm to be moved between its neutral setting (N) and either of the forward (F) and reverse (R) gear positions (see FIG. 2). The stationary mounting panel 205 to which the mounting fixture 202 is secured, takes the reaction force attending forced movement of the shifter arm.

Thus, the self-centering spring device 200 imposes a substantial return force on the shifter arm in response to appreciable displacement of the arm out of position (N), and the force increases as a function of the displacement regardless of the direction in which it occurs.

However, in conventional systems, the spring device 200 is too large in diameter to fit well to the frame of a hydraulic system. Further, the larger end 102 of the spring loaded device 100 (see FIG. 1) has a swivel integrated into it. The cable 101 passes through this swivel into the spring loaded device 100. However, when the spring loaded device 100 is mounted with the smaller end attached to the pedal shaft 103, and the spring cycled, the swivel allows the spring loaded device 100 to collapse when the system causes the inner spring 208 to compress. In other words, the system would work if the spring 208 was extended, but not when the spring 208 was compressed.

Accordingly, a self-centering spring mechanism which would overcome these disadvantages and which would provide a stable and reliable system for centering controls on hydrostatic transmissions and non-detented hydraulic valves, is desired.

SUMMARY OF THE INVENTION

The present invention relates to improvements in conventional spring loaded devices which prevents swivel of the spring loaded device when attached to a hydraulic system.

In one embodiment consistent with the present invention, a spring loaded device assembly includes a spring loaded device for use with hydraulic systems, the spring loaded device including: a spring mechanism disposed in an outer tubular member; an inner tubular member movably disposed in one end of the outer tubular member; an adjustment rod movably disposed in the inner tubular member; a clevis attached to a distal end of the adjustment rod for attachment to a hydraulic system; and a rigid mounting member having two ends, a first end being attached to another end of the outer tubular member, and a second end being attached to the hydraulic system to prevent swivel of the spring loaded device.

In another embodiment consistent with the present invention, the mounting member includes a threaded hole through which a bolt is threaded into the other end of the outer tubular member.

In yet another embodiment consistent with the present invention, the hydraulic system is a bi-directional piston pump.

In yet another embodiment consistent with the present invention, the spring loaded device starts the hydraulic system from only in the neutral position.

In yet another embodiment consistent with the present invention, a distal end of the clevis is attached to a swash plate shaft of the piston pump.

In yet another embodiment consistent with the present invention, the spring mechanism moves the clevis through positions corresponding to forward, reverse, and neutral gear positions.

In yet another embodiment consistent with the present invention, a spring loaded device assembly includes a spring loaded device for use with hydraulic systems, the spring loaded device including: a spring mechanism disposed in an outer tubular member; an inner tubular member movably disposed in one end of the outer tubular member; an adjustment rod movably disposed in the inner tubular member; a clevis attached to a distal end of the adjustment rod for attachment to a hydraulic system; and means for providing rigidity to the spring loaded device when attached to a hydraulic system.

In yet another embodiment consistent with the present invention, the rigidity means includes a mounting member having two ends, a first end being attached to another end of the outer tubular member, and a second end being attached to the hydraulic system to prevent swivel of the spring loaded device.

In yet another embodiment consistent with the present invention, a spring loaded device assembly includes a spring loaded device for use with hydraulic systems, the spring loaded device assembly including means for preventing swivel of the spring loaded device when attached to a hydraulic system.

In yet another embodiment consistent with the present invention, the swivel preventing means includes a rigid mounting member having two ends, a first end being attached to one end of the spring loaded device, and another end being attached to the hydraulic system.

In yet another embodiment consistent with the present invention, a spring loaded device assembly includes a spring loaded device for use with hydraulic systems, the spring loaded device assembly including a rigid mounting member having two ends, a first end being attached to one end of the spring loaded device, and a second end being attached to a hydraulic system to prevent swivel of the spring loaded device.

Finally, in yet another embodiment consistent with the present invention, the two ends of the mounting member are vertical portions connected by a horizontal portion.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

Figure 3:
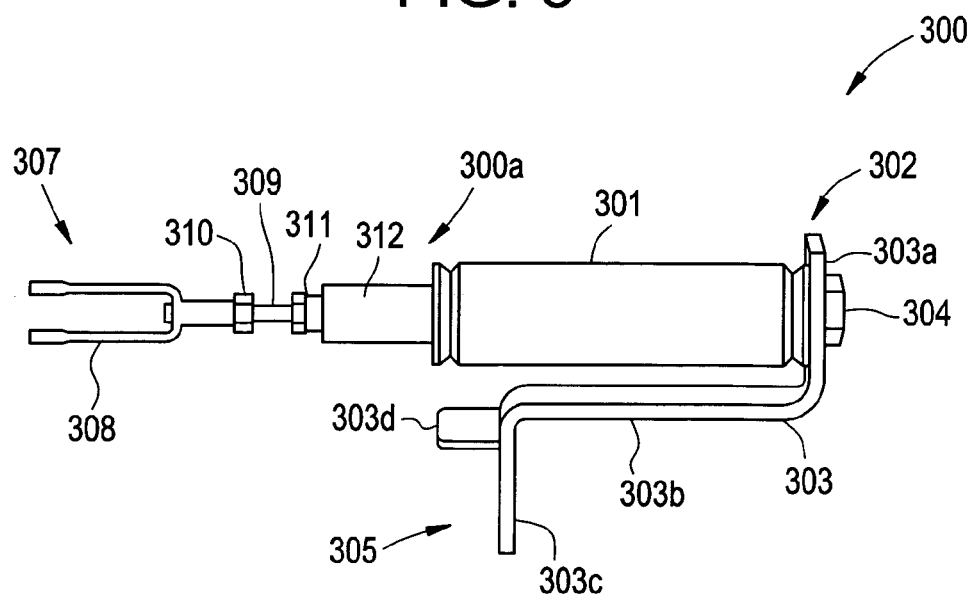
FIG. 3 shows one side view of a spring loaded device assembly, according to one embodiment consistent with the present invention.

One embodiment of the spring loaded device assembly 300, consistent with the present invention, is shown in FIG. 3. The inner structure of the spring loaded device 300A contains similar features as those described in U.S. Pat. No., 4,223,564 to Fawcett, as previously generally described.

Figure 2:
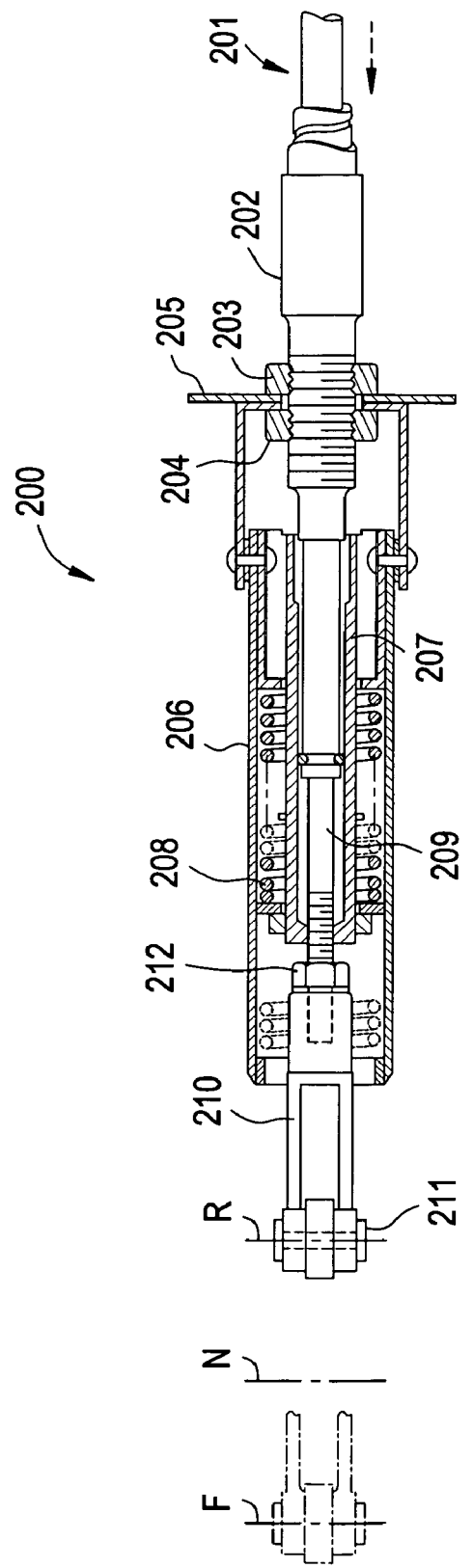
FIG. 2 shows a cross-sectional view of a conventional spring loaded device, in a reverse gear position.
Figure 8:
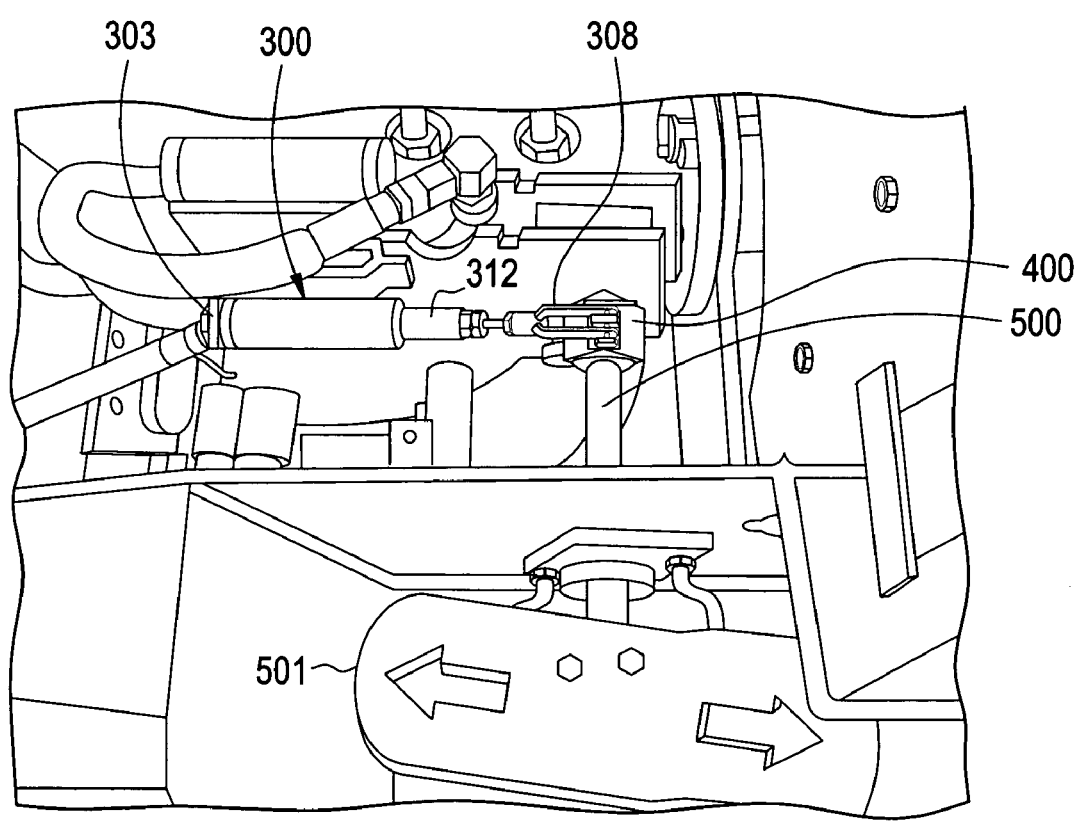
FIG. 8 shows one top view of the spring loaded device assembly of FIG. 4, connected to a pedal shaft.

As shown in FIG. 3, one embodiment of the spring loaded device assembly 300 includes an outer tubular structure 301, which has one end 302 fastened to a vertical portion 303a of a mounting bracket 303 via a threaded bolt 304 to provide rigidity to the spring loaded device 300A and assembly 300. The threaded bolt 304 is internally threaded into the spring loaded device 300A similar to that shown in FIG. 2, for example. Further, the spring loaded device assembly 300 can be bolted in any position 360 degrees around the threaded bolt (see FIG. 8, for example).

In one embodiment consistent with the present invention, the mounting bracket 303 includes a horizontal portion 303b, which runs parallel to the outer tubular member 301, and a second vertical portion 303c at the other end 305 of the mounting bracket 303. For additional stability, the second vertical portion 303c may include a horizontal portion 303d which extends from vertical portion 303c. However, the mounting bracket 303 can be in any shape (i.e., vertical, horizontal) necessary to attach to any structure.

Vertical portion 303c, and in one embodiment, horizontal portion 303d, at end 305 of the mounting bracket 303, may be used to mount spring loaded device 300A to a bi-directional piston pump 400, for example (see FIG. 4), in order to prevent movement of the spring loaded device 300A and to provide rigidity and stability. Further, a direct attachment of the spring loaded device assembly 300 to the bi-directional piston pump 400, for example, adds a higher level of safety to the entire machine. For example, in conventional spring loaded device assemblies, the cable system 101 could sieze or jam, thus, causing the vehicle to take off. By having the spring loaded device assembly 300 attached directly to the pump 400, if the controls fail, the vehicle will return to neutral and stop.

Figure 4:
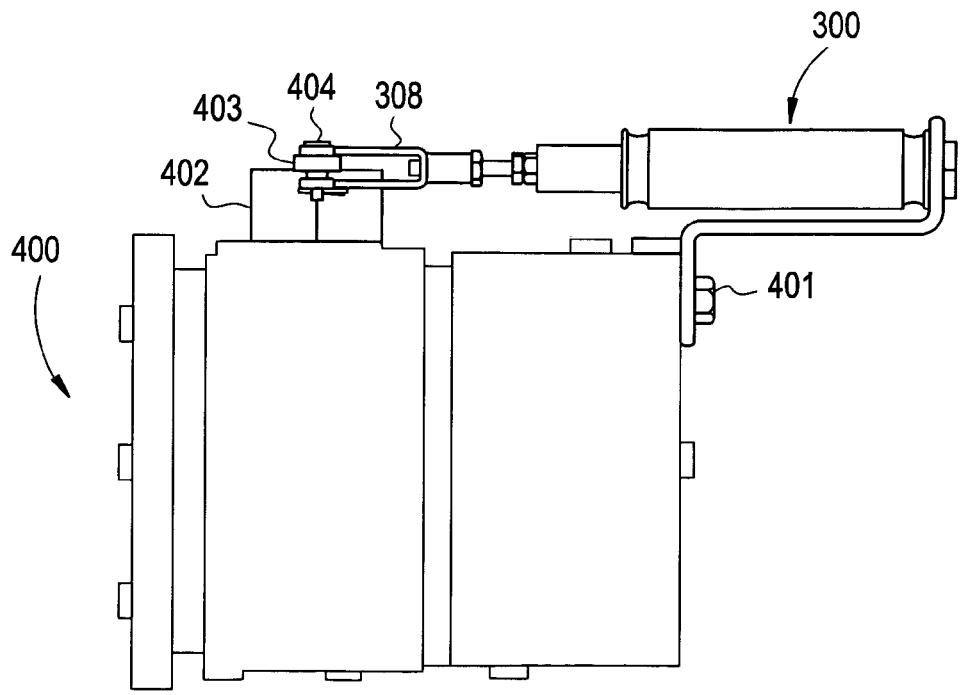
FIG. 4 shows one side view of the spring loaded device assembly of FIG. 3, connected to a bi-directional piston pump, according to one embodiment consistent with the present invention.

Mounting means may include at least one hole in vertical portion 303c, or in horizontal portion 303d, for example, for insertion of at least one nut 401 (see FIG. 4).

However, one of ordinary skill in the art would realize that other means for providing rigidity to the ends 302, 305 of the spring loaded device 300A may be used, such as a rod or a supporting mechanism which would rigidly support the spring loaded device 300A to the piston pump 400 or other system.

In another embodiment consistent with the present invention, the smaller end 307 of the spring loaded device 300A includes a clevis 308 (see FIG. 3) which is attached to a swash plate shaft 402 (see FIG. 4) of a bi-directional piston pump 400, for example, via an attachment means.

In one embodiment consistent with the present invention, the attachment means includes a plate 403 (see FIG. 4) bolted to the tip end of the clevis 308, with a cotter pin 404 securing the plate 403 to the swash plate shaft 402. However, other attachment means to the piston pump 400 can be used, such as a bolt, at the swash plate shaft 402, etc., as would be readily apparent to one of ordinary skill in the art.

In one embodiment consistent with the present invention, the clevis 308 is attached to an all-threaded adjustment rod 309 (see FIG. 3) having a jamb nut 310 and 311 at both ends of the rod 309. The rod 309 is inserted into an inner tubular member 312, which is disposed in the outer tubular member 301. Similarly to the Fawcett spring loaded device, for example, the outer and inner tubular members 301, 312 form an annular space between them in which an elongated helical spring (not shown) is received. The spring is partially compressed in the neutral or centered position of the parts.

In one embodiment consistent with the present invention, a pedal shaft 500 (see FIG. 8) attaches the clevis 308 of the spring loaded device assembly 300 to a pedal 501 which is operated by a user.

In operation, in one embodiment consistent with the present invention, when the user activates the pedal 501, the system must be in the neutral (N) position to start. This is a safety feature, and the electrical connections would only allow the spring loaded device assembly 300 to activate the pump 400 in the neutral (N) position.

Figure 5:
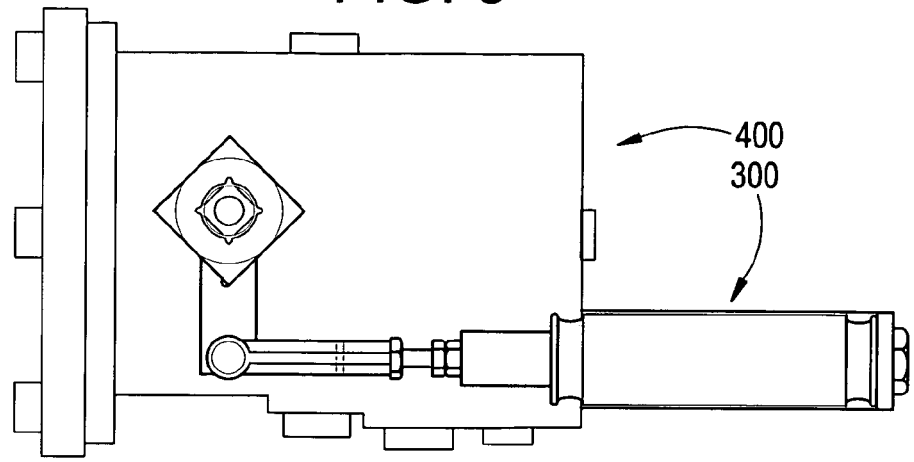
FIG. 5 shows a top view of the spring loaded device assembly of FIG. 4, in the neutral position, according to one embodiment consistent with the present invention.
Figure 6:
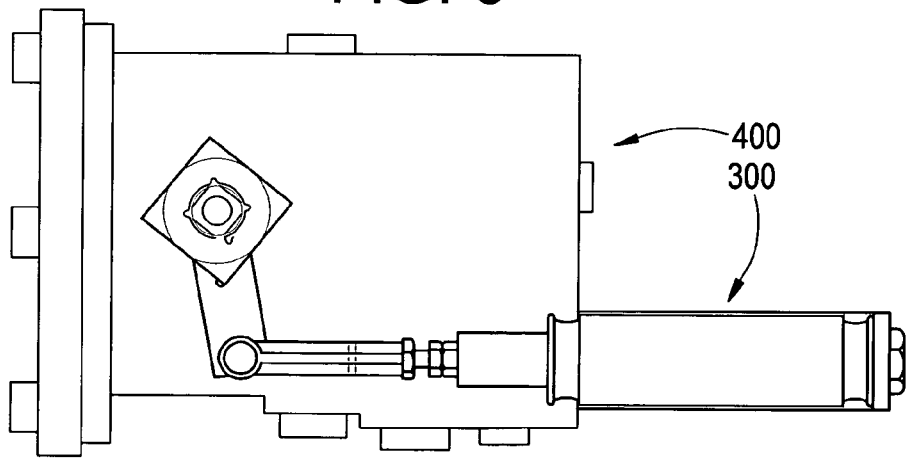
FIG. 6 shows one top view of the spring loaded device assembly of FIG. 4, in the forward position, according to one embodiment consistent with the present invention.

When started by the user activating the pedal 501, the user then places the piston pump 400 or hydrostatic drive transmission into the forward (F) position from the neutral (N) start position (see FIG. 8), and the pedal shaft mechanism 500 turns, moving the plate 403, such that the plate 403 moves in a first direction in a horizontal plane. The adjustment rod 309 is moved such that it enters the outer tubular member 312 of the spring loaded device 300A, compressing the spring within the outer tubular member 301, and the clevis 308 moves from a centered or neutral position (N) (see FIG. 5) in a horizontal direction toward the one end 305 of the spring loaded device 300A to the forward (F) position (see FIG. 6).

Figure 7:
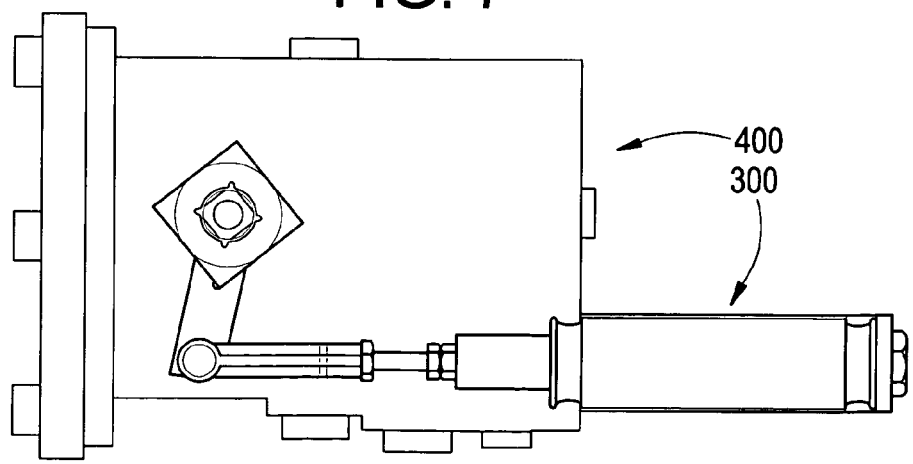
FIG. 7 shows one top view of the spring loaded device assembly of FIG. 4, in the reverse position, according to one embodiment consistent with the present invention.

When the user activates the pedal 501 and places the piston pump 400 or hydrostatic drive transmission into the reverse (R) position (see FIG. 7), the pedal shaft mechanism 500 turns, moving the plate 403, such that the plate 403 moves in a second direction, opposite to the first direction, in a horizontal plane. The adjustment rod 309 is moved such that it extends from the outer tubular member 301 of the spring loaded device 300A, decompressing the spring within the tubular member 301, and the clevis 308 moves from a centered or neutral position (N) in a horizontal direction away from the end 305 of the spring loaded device 300A to the reverse (R) position (see FIG. 7).

To return to the neutral (N) position from forward (F) or reverse (R) gear positions, would require decompression or compression, respectively, of the spring in outer tubular member 301, as described above.

Thus, the only external moveable parts of the embodiment described above of the present invention are the inner, smaller tubular member 312, and the threaded adjustment rod 309 of the spring loaded device 300A. Further, the spring loaded device 300A of the present invention is made smaller in order to fit more easily with the bi-directional piston pump or other hydraulic devices.

Figure 1:
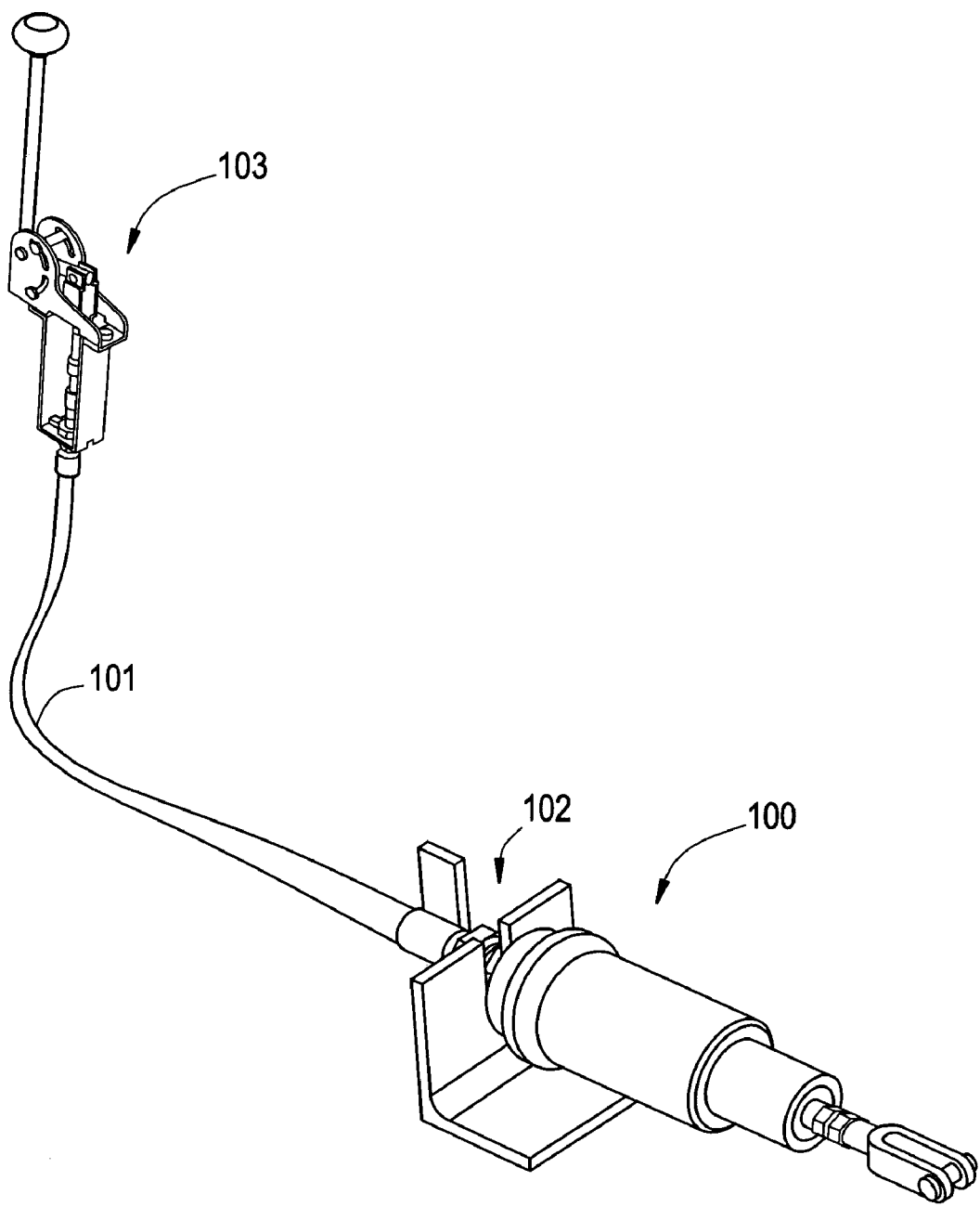
FIG. 1 shows a perspective view of a conventional spring loaded device, connected to a push-pull coaxial cable assembly.

Thus, the present invention removes the conventional cable assembly 101 (see FIG. 1) which was previously attached to the one end of the conventional spring loaded device 100. Further, with the addition of a mounting bracket 303 (see FIG. 3), the spring loaded device assembly 300 of the present invention eliminates the swivel associated with the one end of the spring loaded device 100, which caused the spring holder to essentially collapse when the inner spring was compressed. Thus, the cable assembly 101 of conventional systems is no longer necessary, and the spring loaded device 300A is rigidly held to prevent any movement of the device 300A that could cause collapse.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A spring loaded device assembly that is coupled to a moveable device, the spring loaded device assembly comprising:
    a spring loaded device, comprising:
        an outer tubular member;
        a spring mechanism disposed in the outer tubular member;
        an inner tubular member movably disposed in one end of said outer tubular member;
        an adjustment rod that is coupled to said inner tubular member;
        a clevis attached to a distal end of said adjustment rod for coupling to the moveable device; and
    a shaft that engages the moveable device to impart movement to the moveable device and that engages the clevis to impart a lateral force on the inner tubular member to compress or decompress the spring mechanism.

2. The spring loaded device assembly according to claim 1, wherein said moveable device is adapted to control a bi-directional piston pump.

3. The spring loaded device assembly according to claim 2, wherein the moveable device is a swash plate shaft of said bi-directional piston pump.

4. The spring loaded device assembly according to claim 2, wherein said shaft is adapted to move the bi-directional pump through positions corresponding to forward, reverse, and neutral positions.

5. A spring loaded device assembly that is coupled to a moveable device, the spring loaded device assembly comprising:
    a spring loaded device, comprising:
        an outer tubular member;
        a spring mechanism disposed in the outer tubular member;
        an inner tubular member movably disposed in one end of said outer tubular member;
        an adjustment rod that is coupled to said inner tubular member;
        a clevis attached to a distal end of said adjustment rod for coupling to the moveable device;
    a shaft that engages the moveable device to impart movement to the moveable device and that engages the clevis to impart a lateral force on the inner tubular member to compress or decompress the spring mechanism; and
    a rigid mounting member that is adapted to couple the spring loaded device to a structure that houses the moveable device.

6. The spring loaded device assembly according to claim 5, wherein said rigid mounting member comprises:
    a first end that is attached to another end of said outer tubular member, and a second end that is attached to the structure that houses the moveable device, the rigid mounting member being adapted to prevent swivel of said spring loaded device.

7. The spring loaded device assembly according to claim 1, further comprising a rigid mounting member having two ends, a first end being attached to another end of said outer tubular member, and a second end being attached to a structure that houses the moveable device, the rigid mounting member being adapted to prevent swivel of said spring loaded device.

8. The spring loaded device assembly according to claim 7, wherein said mounting member includes a threaded hole through which a bolt is threaded into said another end of said outer tubular member.

9. The spring loaded device assembly according to claim 7, wherein said two ends of said mounting member are vertical portions connected by a horizontal portion.

* * * * *